United States Patent
Kistler et al.

(10) Patent No.: US 6,961,815 B2
(45) Date of Patent: Nov. 1, 2005

(54) MULTIPLE DISK DATA STORAGE SYSTEM FOR REDUCING POWER CONSUMPTION

(75) Inventors: Michael David Kistler, Pflugerville, TX (US); Ramakrishnan Rajamony, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 475 days.

(21) Appl. No.: 10/313,275

(22) Filed: Dec. 5, 2002

(65) Prior Publication Data

US 2004/0111558 A1 Jun. 10, 2004

(51) Int. Cl.$^7$ .............................................. G06F 12/00
(52) U.S. Cl. ...................................................... 711/114
(58) Field of Search ......................................... 711/114

(56) References Cited

U.S. PATENT DOCUMENTS

2002/0199129 A1 * 12/2002 Bohrer et al. ................... 714/7
2004/0243761 A1 * 12/2004 Bohrer et al. ................ 711/114

OTHER PUBLICATIONS

Sai–Lai Lo, Ivy: A Study on Replicating Data for Performance Improvement, Hewlett Packard Laboratories Technical Report HPL–CSP–90–48, Dec. 14, 1990, Palo Alto, CA.

Rachad Youssef, RAID for Mobile Computers, Master's Thesis, Aug. 1995, Carnegie Mellon University Information Networking Institute.

X. Yu, B. Gum, Y. Chen, R.Y. Wang, K. Li, A. Krishnamurthy, T.E. Anderson, Trading Capacity for Performance in a Disk Array, Proc. Fourth Symposium on Operating Systems Design and Implementation, Oct. 2000.

* cited by examiner

Primary Examiner—Jack Lane
(74) Attorney, Agent, or Firm—Joseph P. Lally; Casimer K. Salys

(57) ABSTRACT

A disk controller connected to a set of disks in a data storage system is configured to mirror a first class of data on multiple disks while storing a second class of data without mirroring. The controller maintains at least one of the disks containing the first class of data in an operational state while maintaining at least one of the remaining disks in a low power state. The first class of data may contain popular files while the second class of data contains unpopular files. The first data class may be mirrored on each of the disks. The data in the second class may be stored with parity where the parity information is maintained on a single disk. The operational disk may be changed following access to data from the second class of data that is stored on one of the low power state disks.

11 Claims, 4 Drawing Sheets

| FILE 171 | SIZE 172 | S/R 173 | DISK 174 | LOC 175 | MOD 176 | LRU 177 | PRI 178 | REGION 179 | |
|---|---|---|---|---|---|---|---|---|---|
| | | | | | | | | | |
| ABC | 200 K | S | 1,2,3 4,5 | T5, S8 | N | 12:02 | 5 | 1 | |
| XYZ | 180 K | R | 2 | T7, S1 | Y | 11:34 | 1 | 3 | |
| | | | | | | | | | |

169 → (ABC, XYZ rows)

| DISK | STATUS 181 | CAPACITY 182 | DATA ALLOC 183 | | PARITY ALLOC 186 | |
|---|---|---|---|---|---|---|
| | | | TOTAL 184 | FREE 185 | TOTAL 187 | FREE 188 |
| 1 | ACTIVE | 100 | | | | |
| 2 | IDLE | 100 | | | | |
| 3 | SLEEP | 100 | | | | |
| 4 | SLEEP | 100 | | | | |
| 5 | SLEEP | 100 | | | | |

| DISK 1 | DISK 2 | DISK 3 | DISK 4 | DISK 5 |
|---|---|---|---|---|
| | | | | |

MULTIPLE DISK DATA STORAGE SYSTEM FOR REDUCING POWER CONSUMPTION

BACKGROUND

1. Field of the Present Invention

The present invention generally relates to the field of data storage systems and more particularly to data storage systems that implement redundant disk arrays.

2. History of Related Art

In the field of data storage, redundant disk arrays are well known. Perhaps the most widely known implementations of disk arrays are referred to as RAID, an acronym for redundant array of independent (or inexpensive) disks. In a RAID system, multiple disks are used to store data more reliably than data can be stored on a single disk. In a single disk system, a disk crash results in the loss of any data that has not been saved to an external storage medium such as a tape. In RAID systems, the use of multiple disks improves reliability by enabling data redundancy. In the context of RAID systems, the term redundancy refers to the system's immunity to disk crashes. More specifically, RAID redundancy enables the system to recover all data following the crash of any single disk within the system.

The varieties of RAID redundancy are the subject of extensive literature. In a RAID 1 system, redundancy is achieved "mirroring", which is simply storing a copy of all data on two (or more disks). Although this type of redundancy is relatively expensive in terms of data storage (because at least 50% of storage capacity is used for redundancy), RAID 1 systems are simple to implement and have performance advantages over other RAID schemes. In a RAID 4 system, data is "striped" across multiple drives to improve performance (by enabling simultaneous access to different sections of a file) while redundancy is achieved by storing parity information on a single drive (the parity drive). In a RAID 5 system, data is typically striped across multiple disks in a RAID 4 fashion, but the parity information is distributed across multiple disks such that a portion is stored on a first disk, a portion on a second disk, and so forth.

Historically, the primary considerations given to the design of RAID systems were performance and storage cost. Performance, in turn, was typically optimized by maintaining all disks in an active (spinning) state to minimize access delays. More recently, an increasingly important consideration in the design of RAID systems is operating cost or energy consumption.

Disk drives contain both mechanical and electronic components that consume energy. The mechanical components rotate the drive platters under the read/write heads and position the heads over a specific track of the platter. The electronic components accept commands from a device bus and process the commands by directing the operation of the mechanical components as necessary.

In current technology disk drives, the majority of the drive's energy consumption is attributable to the drive's mechanical components and, in particular, to the rotational motor responsible for spinning the platters. Consequently, power management techniques for disk drives typically attempt to conserve energy by turning off the rotational motor(s) during periods when the drive is not processing commands. Unfortunately, the performance cost of turning off the drive motors, measured in terms of the time required to return the drive to the active state in which data can be read or written from the disk, is significant (typically 2 to 5 seconds). Thus, in an implementation that aggressively spins down disks to conserve power consumption, performance degradation is a significant issue.

Accordingly, it would be desirable to implement a data storage system and methodology that addressed the issues of energy consumption and performance in a redundant disk array.

SUMMARY OF THE INVENTION

The problems identified above are addressed by a system and method in which a disk controller connected to a set of disks in a data storage system is configured to mirror a first class of data on multiple disks while storing a second class of data without mirroring. The controller maintains at least one of the disks containing the first class of data in an operational state while maintaining at least one of the remaining disks in a low power state. The first class of data may contain popular files while the second class of data contains unpopular files. The first class of data may be mirrored on each of the disks. The data in the second class may be stored with parity where the parity information is maintained on a single disk. The operational disk may be changed following access to data from the second class of data that is stored on one of the low power state disks.

BRIEF DESCRIPTION OF THE DRAWINGS

Other objects and advantages of the invention will become apparent upon reading the following detailed description and upon reference to the accompanying drawings in which:

FIG. 7 and FIG. 8 illustrate exemplary data storage tables employed in one embodiment of the invention; and FIG. 9 illustrates an exemplary register for tracking coherency.

Figure 1:
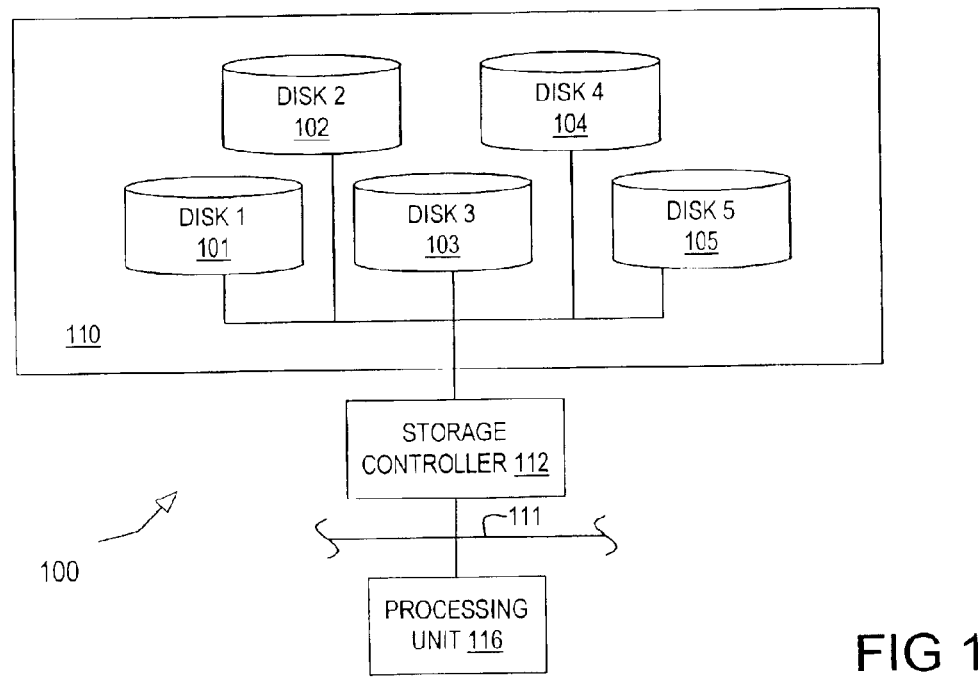
FIG. 1 is a block diagram of selected elements of a data storage system according to the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but to the contrary, the intention is to cover all modifications, equivalents, and alternatives falling within the spirit and scope of the present invention as defined by the appended claims.

DETAILED DESCRIPTION OF THE INVENTION

The present invention contemplates a system and method for reducing energy consumption in server-class or other multiple-disk storage systems. The system uses spare capacity to mirror popular data on multiple disks and an aggressive disk spin-down policy to conserve energy with a minimum of performance degradation. Dynamic file mapping may be employed to further improve the performance and energy consumption. Portions of files that exhibit certain characteristics may be mirrored on multiple disks to reduce read performance penalties. Degrees of mirroring may be employed enabling certain data to be stored on a single disk, other data to be stored on two disks, other data to be stored on all disks, and so forth. The degree of mirroring for any file or other data may be evaluated and altered dynamically based upon access patterns and other considerations.

Turning now to the drawings, FIG. 1 illustrates selected components of a data processing system 100 and its corresponding multiple-disk data storage system according to one embodiment of the invention. In the depicted embodiment, system 100 includes one or more processing units 116 (one of which is shown) coupled to a storage controller 112 through an interconnect 111. Processing unit 116 may be implemented with any of a wide variety of data processing systems typified by a microprocessor based computing system such as a network server, network computer, workstation, desktop computer, and the like. The interconnect 111 may be implemented with wire cabling such as in a conventional Ethernet or token ring network, optical fiber, or with wireless technology.

Storage controller 112 includes elements of a conventional RAID controller and is suitable for managing the storage of data on the array of disks 110. Accesses (reads and writes) of data to array 110 initiated by any processing unit 116 are handled by controller 112. Thus, controller 112 determines, for example, the manner in which data redundancy and data striping are achieved. Storage controller 112 preferably maintains one or more data tables, described in more detail below, that facilitate the allocation of storage and the redundancy implementation. Storage controller 112 also controls the mechanical state of each of the disks 101 through 105 of disk array 110. It will be appreciated that, although the depicted embodiment employs a disk array having five disks, the precise number of disks in disk array 110 is an implementation specific detail that does not substantially alter novel components of disk controller 112.

Storage controller 112 is preferably configured to implement a hybrid of conventional RAID redundancy schemes to achieve high performance (low access latency) while simultaneously minimizing energy consumption. In one embodiment, storage unit 112 is configured to determine a storage priority for each file or other portion of data. The storage priority is indicative of the corresponding data's popularity and stability. Data that is accessed frequently, but rarely modified, is assigned a high storage priority, while data that is rarely accessed or frequently modified is assigned a low storage priority.

Storage controller 112 uses the storage priority factor to determine the storage organization to be used for the corresponding data. Data having the highest storage priority may be mirrored on every disk 101 through 105 of disk array 110 while data having a lowest storage priority may not be mirrored at all, but still protected from disk failures using parity. Typically, all data in disk array 110 will be stored in an organization that provides protection against data loss in the event of a disk crash. Thus, even data having the lowest storage priority would typically be stored with RAID parity such as in a RAID 4 or RAID 5 system (i.e., with the corresponding parity information being stored on a single disk or distributed across multiple disks).

Storage controller 112 may implement various levels of complexity in determining storage priorities. At one extreme, a "binary" storage priority is used to determine whether data is mirrored on multiple disks or not mirrored but protected with parity. In such a binary priority implementation, data having a first storage priority is stored on every disk 101 through 105 of disk array 110 while data having a second storage priority is stored on a single disk (or possibly striped across multiple disks) without mirroring, but protected from failures using parity.

Figure 2:
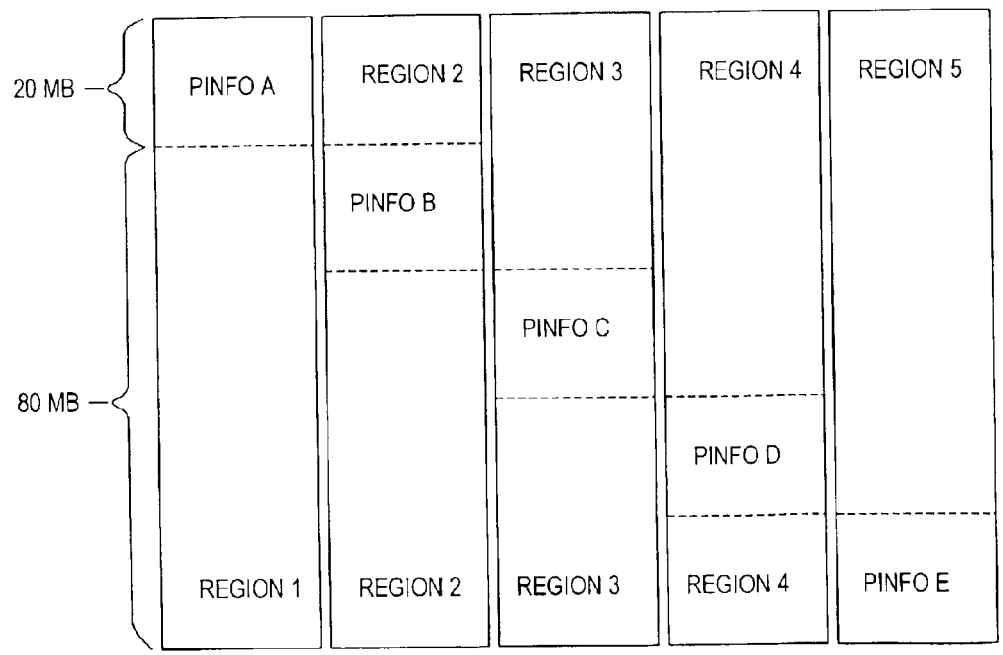
FIG. 2 is a conceptual representation of data storage allocation according to the prior art.

Referring now to FIG. 2, a conceptual depiction of the manner in which data is stored by a conventional RAID controller across disks in a disk array is depicted to provide a point of reference for the subsequent description of the invention. The depicted implementation illustrates a RAID 5 storage scheme. In RAID 5, parity information is distributed across all of the disks in the disk array, typically in a stair-step fashion as shown. In this conceptualization, the data on each disk is identified as a single data region. Thus, for example, data region 2 represents all of the data storage on disk 2, data region 3 represents all of the data storage on disk 3, and so forth.

A characteristic of RAID parity is that, in a disk array having N equi-sized disks, 1/N of the total storage capacity is dedicated to storing parity information. This parity information typically takes the form of the Exclusive OR (EXOR) product of the data having the same address on the remaining disks. (RAID parity information stands in contrast to ECC, checksum, or other error correction techniques in which the data itself includes error correction information that indicates whether the corresponding data is correct). Thus, in the depicted embodiment having five disks, 20% of the total capacity is needed for parity information. Data is stored on the remaining 80% of the capacity such that any particular piece of data is stored on just a single disk.

The depicted embodiment illustrates a set of five disks, each having a capacity of 100 MB, for a total capacity of 500 MB. Of this capacity ⅕ of each disk (20 MB) is needed for parity information and 80 MB is available for data. Thus, 400 MB of data storage is available. While this represents a desirable ratio of available storage to total disk array capacity, it will be appreciated that, reducing energy consumption in a conventional RAID 5 implemented disk array would typically cause a significant performance penalty. More specifically, assuming that accesses to disk are more or less randomly distributed across drives, each disk is accessed by roughly 20% of the total disk array accesses. If an energy conservation policy is employed in which disks are aggressively powered down (spun down) when not in use, one can appreciate that a considerable percentage of disk accesses will be made to disks that are in a powered down state thereby causing substantial performance penalties as powered down disks are turned on. In a conventional RAID 4 format (not depicted) where the parity information is concentrated in a single disk drive, a similar dilemma is presented when trying to aggressively spin down disks.

To address the power-consumption/performance tradeoff forced by conventional RAID implementations, the present invention contemplates storage schemes that may employ multiple RAID techniques on a single disk array in conjunction with disk access pattern data and analysis to store selected data using mirroring on multiple disks while storing other data without mirroring but still protected from failures by parity information. In addition, the invention pursues an aggressive energy conservation policy by maintaining one or more disks in a low power state. The Advanced Technology Attachment (ATA) specification identifies four power states employed by compliant disk drives. The Active state represents normal drive operation. In an Idle state, the disk electronics power down but still receives commands. In a Standby state, the drive spins down and the electronics power down. In a Sleep state, every thing is powered down, and the electronics will not respond except for a power reset.

Figure 3:
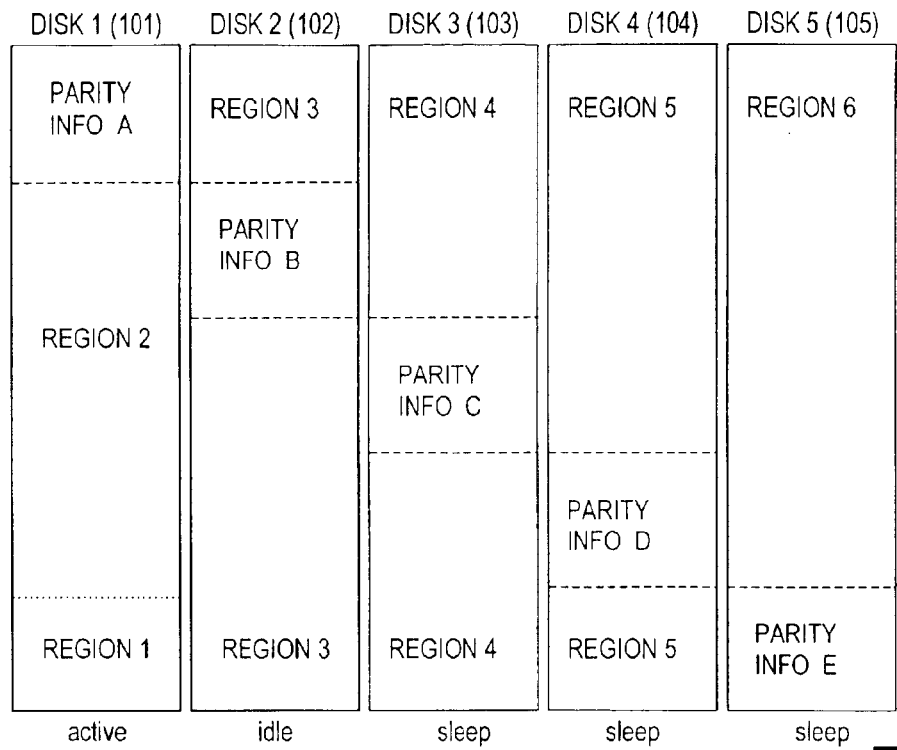
FIG. 3 is a conceptual representation of data storage allocation on the data storage system of FIG. 1 according to one embodiment of the invention.
Figure 5:
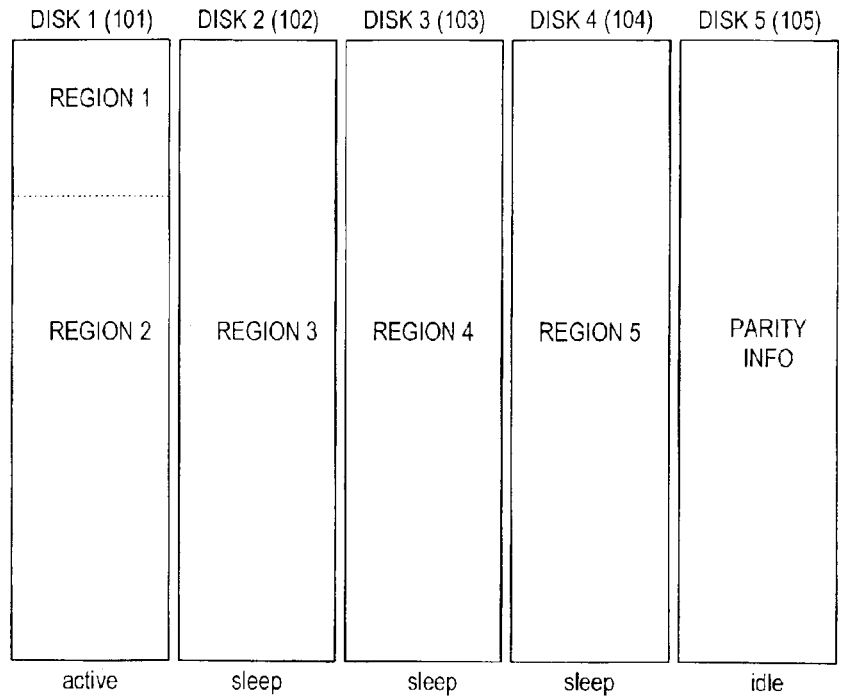
FIG. 5 is a conceptual representation of data storage allocation on the data storage system of FIG. 1 according to one embodiment of the invention.

Referring to FIG. 3 and FIG. 5, conceptual illustrations of disks 101 through 105 are presented to illustrate storage methodologies employed by one embodiment of storage controller 112 and system 100 according to the present invention. In each of these embodiments, each piece of data is stored on just a single disk (i.e., not mirrored), but disk access patterns are analyzed to route the storage of popular data to a single disk while less popular data is distributed across one or more of the remaining disks. In the absence of data mirroring, parity is maintained in a RAID 5 (FIG. 3) or RAID 4 (FIG. 5) manner.

The embodiments depicted in FIG. 3 and FIG. 5 represent a desirable improvement over conventional RAID 4 and RAID 5 configurations. Popular data is biased or routed to a single disk drive. In the depicted embodiments, popular data is represented by the region of storage identified as REGION 1, which is illustrated as residing on DISK 1 (101). In FIG. 3 and FIG. 5, disk 101 is shown as including a second region (REGION 2). In some embodiments, REGION 2 may be eliminated such that all of the data storage of disk 101 is allocated to REGION 1. In other embodiments, storage controller 112 may limit the size of REGION 1 to ensure that the data maintained in REGION 1 is accessible with the lowest latency.

It is believed that, in most data collections, a relatively small portion of the data accounts for a relatively large percentage of data accesses. Under a widely circulated, if less than scientific, rule of thumb, roughly 90% of all data accesses target roughly 10% of the data. The data storage structures shown in FIG. 3 and FIG. 5 reflect this rule of thumb by allocating a relatively small portion of data that is accessed frequently to a single disk. Assuming that a relatively large percentage of accesses are confined to data stored in REGION 1, it will be appreciated by those having the benefit of this disclosure that the data organization schemes of FIG. 3 and FIG. 5 are compatible with an energy conservation policy in which one or more disks are powered down a majority of the time.

More specifically, one or more of the disk drives not containing REGION 1 are spun down or otherwise transitioned to a less than full power state (such as an Idle state or a Sleep state). Thus, as depicted in FIG. 3 and FIG. 5, disk 101 is preferably maintained in an active state because it contains the most popular data. Of the remaining disks, one disk (the parity disk) may be maintained in an idle state while the others are put into a sleep mode. In the RAID 4 configuration of FIG. 5, the parity disk 105 may be maintained in an idle mode to improve performance. In the RAID 5 configuration of FIG. 3, the parity disk may vary because the parity information is distributed across all disks. If the parity information associated with REGION 1 is confined to a single disk such as disk 105, that disk may be maintained in an active or idle state while disks 102, 103, and 104 are put into a sleep state. If the parity associated with REGION 1 is distributed across two or more disks, the disk designated as the parity disk that is maintained in an active or idle state may be the last disk from which parity information was accessed.

In the embodiments depicted in FIG. 3 and FIG. 5, storage controller 112 preferably maintains the data allocated to REGION 1 dynamically. When an access for data not found in REGION 1 occurs, storage controller 112 may update or modify the storage allocation to place the requested data in REGION 1. This dynamic maintenance of REGION 1 is designed to keep the most requested data on a single disk, so that the remaining disks may be placed in a low power state. Thus, when data from another region (such as REGION 3, 4, or 5) is accessed, storage controller 112 activates the disk containing the requested data and retrieves it. Thereafter, storage controller 112 may update the storage allocation by writing the requested data into the REGION 1 storage area.

To accomplish this updating of REGION 1, storage controller 112 may first determine the size of the requested data and compare it to the storage available in REGION 1. If the requested data is smaller than the amount of available storage in REGION 1, the data may be stored into REGION 1 immediately and the data directory updated to reflect the data's new location. If the requested data is larger than the storage available in REGION 1, storage controller 112 may determine which data currently stored in REGION 1 is to be relocated.

The determination of whether the size of requested data exceeds the available storage on a given disk and the determination of what data, if any, to delete or remove from REGION 1, is preferably facilitated by storage directories or tables such as the tables 170 and 180 depicted in FIG. 7 and FIG. 8 respectively. Storage table 170 includes one or more entries 169. Each entry 169 corresponds to a file or data block maintained by system 100 and storage controller 112.

In the depicted embodiment of table 170, each entry 169 includes file name information 171, file size information 172, sequential/random (S/R) indicator 173, disk information 174, location information 175, modification status information 176, least recently used information 177, mirroring information 178, and region location information 179. File name information 171 and file size information 172 identify the data by file name and indicate the size of the associated data. S/R indicator 173 indicates whether the corresponding entry is for data classified as part of a sequentially accessed file or a randomly accessed file. Disk information 174 indicates the disk or disks on which the data is currently stored. In the depicted illustration, the file "ABC" is popular data that is stored on disks 1, 2, 3, 4, and 5 (as described in greater detail below) while file "XYZ" is located on disk 2 exclusively.

Location information 175 indicates a storage location within the specified disk. In the illustrated example, location information 175 includes a track (T) and sector (S) indicator, which are typical of disk storage systems. Modification status 176 indicates whether the data has been written recently and LRU information 177 indicates when a data block was last accessed.

The storage priority 178 is indicative of how popular the file is (how frequently the data is accessed) and is used to determine the storage organization needed for a particular file. Region information 179 indicates the data region in which the data is stored. In this embodiment, data regions represent collections of data blocks. Although directory 170 is illustrated as including the data shown for each file, it will be appreciated that additional or less information may be maintained for each file and that the data may be formatted differently than shown. In one embodiment, multiple tables similar to table 170 may be maintained by storage controller 112. As an example, controller 112 may maintain a table 170 for each region of data.

Table 180 provides a macroscopic view of the disks 101 through 105 by indicating for each disk, its status information 181, capacity information 182, data allocation information 183 including the amount of storage allocated for data 184 and the amount of storage free for data allocation 185, and parity allocation information 186 including the amount of storage allocated for parity 187 and the amount of storage free for parity allocation 188.

Using the information in table(s) 170 and 180, controller 112 may dynamically maintain the data contained in REGION 1. If an access to data not contained in REGION 1 is made, controller 112 may move the requested data to REGION 1 using the information in tables 170 and 180 to determine whether any data currently residing in REGION 1 needs to moved elsewhere and, if so, which data should be moved. In one embodiment, the least recently used information 177 of table 170, which indicates when the most recent access to the corresponding data block was made, is used to prioritize the data that may be removed when capacity in REGION 1 is limited. Typically, the data that was least recently accessed is the first data to be moved elsewhere when new data is added to REGION 1. The size information 172 facilitates the determination of how many data blocks must be removed when new data is added to REGION 1 (and capacity is constrained).

Figure 4:
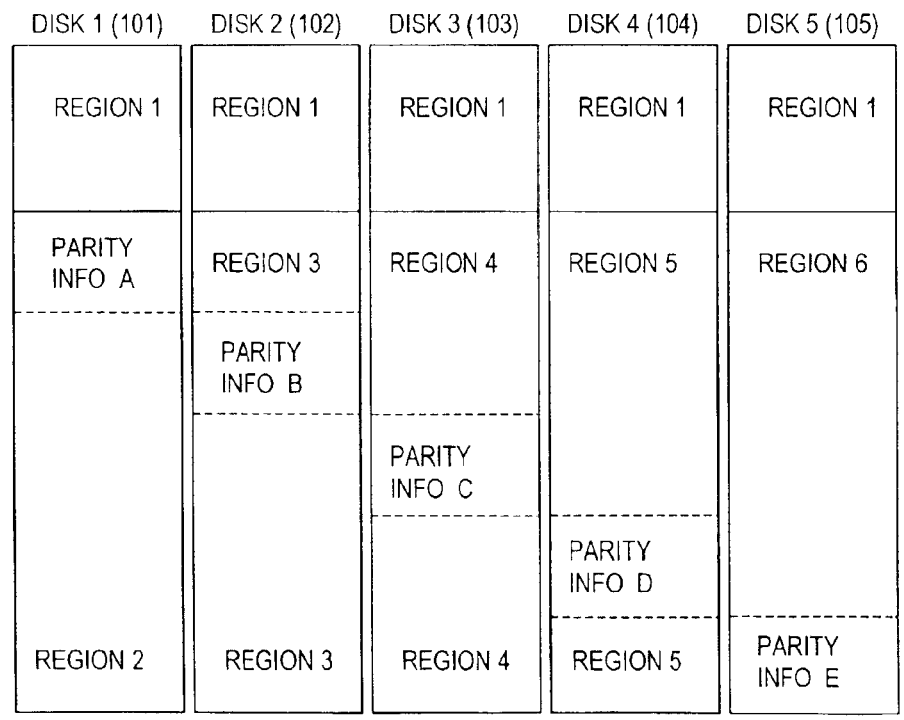
FIG. 4 is a conceptual representation of data storage allocation on the data storage system of FIG. 1 according to one embodiment of the invention.
Figure 6:
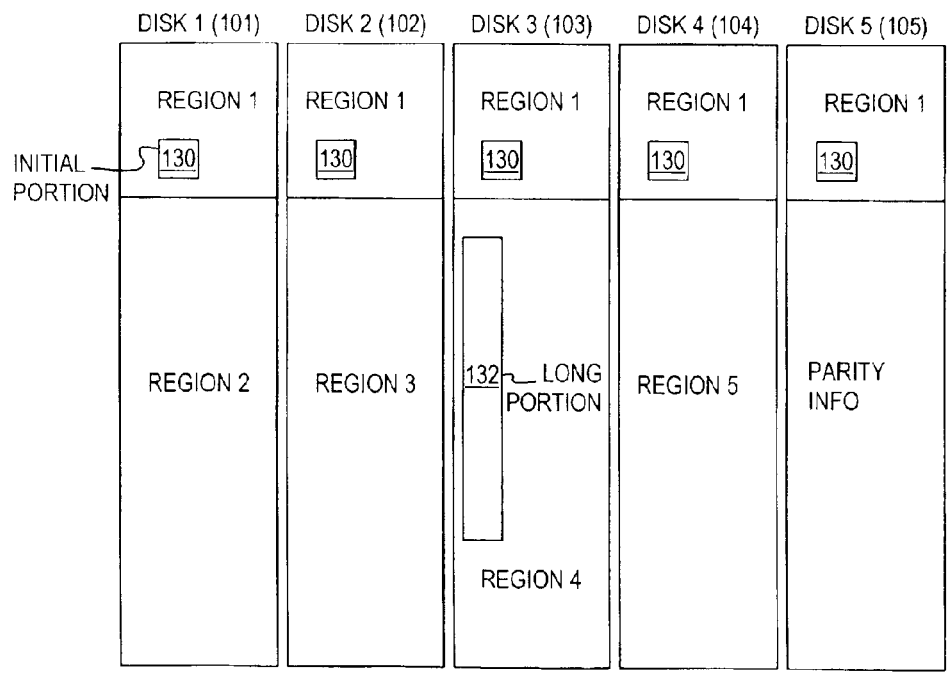
FIG. 6 is a conceptual representation of data storage allocation on the data storage system of FIG. 1 according to one embodiment of the invention.

Turning now to FIGS. 4 and 6, which are conceptual representations of embodiments of the present invention employing hybrid RAID schemes to reduce disk storage power consumption even further than the embodiments depicted in FIG. 3 and FIG. 5. In FIG. 3 and FIG. 5, although popular data is maintained on a single disk, it will be appreciated that accesses to other information will inevitably occur. The examples of the present invention depicted in FIG. 4 and FIG. 6 represent embodiments in which the popular data represented by REGION 1 is mirrored (as in RAID 1) on two or more disks 101 through 105 while the remaining data regions are maintained in a traditional RAID 5 (FIG. 4) or RAID 4 (FIG. 6) manner.

By replicating REGION 1 on multiple disks, the embodiments depicted in FIG. 4 and FIG. 6 beneficially require even fewer power transitions of disks 101 through 105 because there is a higher probability that the disk most recently accessed includes the most popular data (REGION 1). In the depicted embodiments, for example, REGION 1 is mirrored on every disk 101 through 105. This embodiment guarantees that the most recently accessed disk contains REGION 1.

In other embodiments, the number of disks on which REGION 1 is mirrored may vary between 2 and N where N is the total number of disks in system 100 (e.g., five in the depicted examples). Controller 112 may choose the storage organization of REGION 1 based on its storage priority, which may be determined by analyzing historical data access patterns to determine the frequency with which files are accessed. Controller 112 may record the determined storage priority in a table such as table 170 described previously with respect to FIG. 3 and FIG. 5.

Table 170 is preferably also suitable for use in the embodiments depicted in FIG. 4 and FIG. 6 where a hybrid RAID scheme is employed in conjunction with a disk spin-down policy to conserve disk power consumption. More specifically, table 170 as depicted in FIG. 7 includes the storage priority 178 which is used by controller 112 to determine the storage organization for the data. For data stored in a mirrored organization, the storage priority 178 further determines the number of disks on which to mirror the corresponding data. Alternatively, the storage priority 178 may indicate that the data should not be mirrored, but instead be protected with parity. By incorporating a storage priority into table 170, the invention contemplates flexible storage organization that can be optimized to accommodate the data access patterns occurring during actual usage of the data.

In an embodiment suitable for ease of implementation, two storage priority levels are used. Data with the first level of storage priority, typically including files that are not accessed frequently, are stored on a single disk and protected from disk failures by parity information stored on a separate disk. Data with the second level of storage priority, typically including frequently accessed files, are mirrored on every disk 101 through 105. Embodiments of this type are illustrated in FIG. 4 AND FIG. 6. Although FIG. 4 and FIG. 6 are substantially the same except for the parity implementation for the non-mirrored data (FIG. 4 uses RAID 5 parity while FIG. 6 uses RAID 4 parity), the embodiment depicted in FIG. 6 will be discussed in further detail because the RAID 4 implementation is consistent with the present invention's desire to minimize the number of active disks and active disk transitions. Because all parity is stored on a single disk (105 in the illustration) in a RAID 4 configuration, the RAID 4 implementation will generally require fewer disk transitions than a RAID 5, distributed parity scheme.

As depicted in FIG. 6, disks 101 through 105 contain five data regions (REGIONs 1–5) on disks 101 through 104 and a parity region on disk 105. Each of the disks 101 through 105 includes a copy of the most popular data, represented by REGION 1,that occupies a portion of the disk storage capacity that is typically in the range of 10 to 30 percent. The remainder of the capacity available on each disk 101 through 104 contains data that is not mirrored. Thus, disk 101 includes a non-mirrored data represented by REGION 2, disk 102 includes non-mirrored data represented by REGION 3, and so forth. Redundancy is achieved using parity on disk 105 for non-mirrored REGIONS 2 through 5. The parity information is typically calculated based upon the data in the remaining disks such that, if any one disk crashes, its data can be regenerated using the surviving disks. In an implementation that will be familiar to those skilled in the design of RAID systems, the parity information on disk 105 is the exclusive or (EXOR) product of the data on disks 101 through 104.

By replicating selected data (REGION 1 data) on multiple disks and using RAID 4 or RAID 5 redundancy on the remaining data, the embodiments of the invention depicted in FIG. 4 and FIG. 6 beneficially trade storage capacity, which is typically relatively cheap and prevalent, for reduced disk drive energy consumption. In the preferred embodiment of FIG. 6, two disks are typically in an active (spinning) state at any time, namely, one of the disks 101 through 104 as well as the parity disk 105. Because each data disk (disks 101 through 104) contains a copy of REGION 1, a single active data disk is sufficient to handle read accesses to REGION 1. If an access to a non-mirrored data region that is not contained on the active disk occurs, disk controller 112 may spin down the currently active data disk and activate the disk containing the requested non-mirrored region. In this manner, it may be possible to maintain only two active disks for a great majority of the operation and to incur an active disk transition (spinning up an idle disk and spinning down the currently active disk) only when non-mirrored data (not on the currently active disk) is accessed.

In one embodiment, the goal of accessing just two (or fewer) disks is furthered by employing a RAID 4 (or RAID 5) design in which "wide" data stripes are preferred to narrow stripes. In conventional RAID 4 and RAID 5 designs, performance is enhanced by striping data across multiple disks. In a striped implementation, a first portion of a file resides on a first disk, a second portion resides on a second disk, and so forth. Performance is improved because different portions of the file may then be accessed simultaneously. To minimize the number of active disks and the number of active disk transitions, however, one embodiment of the present invention employs wider stripes such that large portions of the non-mirrored data files reside on a single disk. At its extreme, an entire data file may reside on a single disk such that only that single disk need be active to access the file. This wide striping of non-mirrored data, while contrary to conventional RAID designs that are motivated primarily by performance considerations, is consistent with the desire to minimize active disk transitions in the present invention.

Disk controller 112 may employ dynamic mapping of non-mirrored data to avoid an active disk transition during write operations. If, for example, disk 101 is the active data disk and a request to write to data currently stored in REGION 3 of disk 102 is received, disk controller 112 may write the data to disk 101, update the storage tables or directories, and mark the old copy of the data in region 3 as invalid or free.

One embodiment of the invention enables improved performance by permitting a portion of a file to reside in REGION 1, which is mirrored on multiple disks, while another portion of the file is stored in a non-mirrored data region such as REGIONS 2 through 6. This embodiment is particularly beneficial in reducing the latency that occurs when a file, and more particularly a sequential file, residing on a non-active disk is accessed. Sequential files represent files that are accessed sequentially starting from an initial byte and proceeding forward. Software code is typically accessed sequentially. Sequential files are contrasted with randomly accessed files, such as databases, that may be accessed in a random fashion. In the embodiment of table 170 depicted in FIG. 7, data may be characterized as either sequential or random using the S/R indicator 173. It may be desirable in some embodiments to store leading portions of a sequential file as popular data in REGION 1 while storing the rest of the file in non-mirrored data. If the file is accessed, the initial portion (which is typically the first portion required when accessing a sequential file) is present in REGION 1. While this portion of the file is being read, the disk on which the remaining portion of the data resides may be activated. Although a disk transition occurs, the performance penalty (latency) is minimized because the initial portion of the file is available can be accessed in parallel with spinning up the disk containing the rest of the file. This feature of the invention is illustrated in FIG. 6, by the relatively long file 132 in region 4 and its initial portion 130, which is mirrored in REGION 1 on disk 101 through 105.

In another embodiment of data storage system 100, the files or data stored in each copy of REGION 1 may temporarily vary from disk to disk depending on the manner in which data is accessed. More specifically, any modifications to the data stored in REGION 1 may be preferentially or selectively performed in the active copy of REGION 1 (the copy of REGION 1 residing on the currently active data disk). If data is written into REGION 1, controller 112 may perform the write operation to just the currently active copy of REGION 1 and indicate that a modification has taken place by setting the appropriate modification indicator 176 (of table 170 in FIG. 7). When an active disk transition occurs, controller 112 may interrogate the modification indicator bits 176 to see if any data have been modified. If data has been modified, controller 112 will copy the contents of the active REGION 1 into the REGION 1 of the newly accessed disk. Thereafter, the storage controller 112 may reset all modification bits 176, change the disk information 174 in table 170, and update status information 181 in table 180 to reflect the currently active disk. An additional table or register 190, depicted in FIG. 9 may be employed in this embodiment to track which disks have the current version of REGION 1. Register 190, in its simplest form, may contain a single bit for each disk 101 through 105. When the active copy of REGION 1 is modified, the corresponding bit in register 190 is set while all other bits are cleared. Upon an active disk transition, when controller 112 copies the previously active REGION 1 to the newly active disk, the register 190 bit corresponding to the newly active disk is set.

In this manner, the bits in register 190 that are set indicate the disks that contain a current copy of REGION 1. When an active disk transition occurs, controller 112 can reference register 190 to determine if it is necessary to update REGION 1 on the newly active disk.

It will be apparent to those skilled in the art having the benefit of this disclosure that the present invention contemplates an energy conserving data storage system that minimizes performance penalties and leverages excess storage capacity. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data storage system, including
a set of disks;
a disk controller connected to the set of disks and configured to mirror a first class of data on a plurality of the set of disks and to store a second class of data in the set of disks without mirroring but protected by parity information; and
means for maintaining at least one of the disks containing the first class of data in an operational state while maintaining at least one of the remaining disks in a low power state.

2. The system of claim 1, wherein the first class of data is characterized as containing popular files while the second class of data is characterized as containing unpopular files.

3. The system of claim 1, wherein the disk controller is further configured to mirror the first class of data on each of the disks in the set of disks.

4. The system of claim 3, wherein the disk controller is further configured to store each data block in the second class of data on a single disk.

5. The system of claim 4, wherein the disk controller is further configured to determine and store parity information associated with the second class of data on a single disk different from the single disk on which the second class of data is stored.

6. The system of claim 1, wherein the disk controller is further configured to allocate a portion of each disk for the storage of the first class of data and a remaining portion of each disk to the storage of the second class of data or parity information associated therewith.

7. The system of claim 6, wherein all of the parity information associated with the second class of data is stored on a single disk.

8. The system of claim 7, wherein at least one file of the second class of data is stored entirely on a single disk that is different from the parity disk.

9. The system of claim 7, wherein the means for maintaining the disks includes means for maintaining one of the disks containing the first class of data in an operational state while maintaining a plurality of the remainder of the disks in a low power state.

10. The system of claim 9, further comprising means for changing the operational state disk following access to data from the second class of data that is stored on one of the low power state disks.

11. The system of claim 10, further comprising means for maintaining coherency among the first class of data stored on different disks following a changing of the operational disk.

* * * * *